United States Patent Office 3,179,657
Patented Apr. 20, 1965

3,179,657
PROCESS FOR PURIFYING CAPROLACTAM
Anthony N. Naglieri, 2517 Radcliff Ave., Bronx, N.Y.
No Drawing. Filed May 24, 1962, Ser. No. 197,246
16 Claims. (Cl. 260—239.3)

This invention relates to processes for refining crude lactams, more particularly to such processes involving an oxidation and a distillation treatment, and especially to such processes wherein the oxidation is carried out with a concentrated aqueous solution of the lactam whereby efficient color body removal is achieved with minimal loss of lactam.

Lactams and particularly E-caprolactam are commercially important materials which may be produced in accordance with known techniques. However, for some commercial purposes the material obtained even after distillation is not satisfactory, especially for forming polymers and filaments, fibers or molded products therefrom. Several processes have been proposed heretofore for refining such lactams. These may involve an oxidation treatment in dilute solution, or reduction, or treatment with an ion exchange resin, in dilute solution, or freezing, or distillation, or the like. The art is still confronted by the problem of providing more efficient processes for refining crude lactams, expecially those containing 5, 6 or 7 atoms in the ring.

The discoveries associated with the invention and relating to the solution of the above problems, and the objects achieved in accordance with the invention as set forth herein include the provision of:

A process for refining a crude lactam including the steps of oxidizing it with an oxidant in aqueous solution and distillation including the improvement which comprises conducting the oxidation with the lactam in aqueous solution at a concentration in the range of about 55 to 90% by weight;

Such a process wherein the lactam is E-caprolactam;

Such a process wherein the oxidation temperature is in the range of 20° to 40° C. and the amount of oxidant is equivalent to the amount of potassium permanganate which gives a pink color to the mixture, which color persists for 15 minutes;

Such a process wherein the oxidizing solution is filtered, neutralized with an acid-binding material and promptly distilled;

Such a process wherein the acid binding material is a strongly basic anion exchange resin;

Such a process wherein the concentration in the oxidizing step is in the range of 58 to 80%;

Such a process wherein the oxidation is with potassium permanganate in dilute aqueous solution in an amount such that the pink color of the mixture persists for about 15 minutes at ambient temperature;

Such a process wherein the solution contains at least about 60% of the lactam in the resin treating step;

Such a process wherein the solution is diluted with water to about 20% concentration after oxidation and before treatment with the resin;

Such a process wherein the oxidized solution is stripped of water and the residue is dissolved in benzene, treated with an insoluble acid salt and with an insoluble basic material each in an amount in the range of about 1 to 5% based on the weight of caprolactam in the solution, and then the caprolactam is recovered by distillation;

Such a process wherein the oxidation is with potassium permanganate;

Such a process wherein the oxidation is with hydrogen peroxide;

Such a process wherein the acid salt is sodium bisulfate and the basic material is calcium hydroxide;

Such a process wherein the acid salt is sodium dihydrogen phosphate and the basic material is barium hydroxide;

Such a process wherein the oxidation solution is stripped of water, the residue is dissolved in benzene, and the resulting solution is passed through a column of polar adsorbent prior to distillation;

Such a process wherein the adsorbent is activated alumina; and

Other objects which will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

*Example 1*

A solution of crude distilled E-caprolactam in 15 ml. water containing 77% by weight of the lactam is treated with sufficient 4% aqueous potassium permanganate so that the pink color of the resulting solution persists for at least 15 minutes. The amount of permanganate is 0.4 gm. and may be in the range of about 0.2 to about 0.6 gm., depending on the amount of impurities in the crude caprolactam, and ambient temperatures are used. If desired, excess potassium permanganate may be reduced by adding a small amount of sodium bisulfite. The resulting mixture is filtered promptly to remove precipitated manganese dioxide, and the filtrate containing about 70% caprolactam is passed through a vertical column (⅝ in. I.D.) containing 50 ml. of a strongly basic anion exchange resin (a styrene copolymer containing quaternary ammonium groups, e.g. Amberlite IRA-410 in basic form), at a rate of approximately 2 ml./min. The resulting liquid is subjected to vacuum evaporation to remove water, e.g. on a rotary film evaporator, and the remaining caprolactam is fractionated through a spinning band column. The resulting heart-cut or product has a set point of 69.2° C., a permanganate number of 6.0 and an acidity of neutral, which product is well within the highest specifications for super refined commercial E-caprolactam.

The fore-cut and the residue from the distillation may be reprocessed with additional crude, and in this way an about 98% recovery of refined caprolactam is obtained based on the caprolactam content of the starting material.

It is desirable that the concentration of lactam be at least 61% in the resin treating step, for obtaining the quality product economically, in accordance with this example. Sufficient resin is used so that the effluent is substantially neutral, and any convenient contacting and separating procedure may be used. Generally the contact time is short, desirably not over 30 minutes and preferably about 5 to 10 minutes. The temperatures used are in the range of 20° to 40° C.

A treatment with a small proportion of an acid such as hydrochloric acid, after the basic resin treatment, may give an improved quality product (the amount of acid residue in the product being so low that it is within the quality range wanted).

The permanganate number is defined at 200 times the change in absorbance at a wave length of 410 millimicrons after 4 minutes of 50 ml. of a 1% lactam-water solution containing 0.5 millimols of potassium permanganate in a 2.2 cm. cell (e.g. a 2.2 cm. light path through the liquid).

Similar results are obtained with other lactams, such as D-valerolactam or butyrolactam.

Example 2

The procedure of Example 1 is repeated except that the concentration of the lactam is 64% and just before it is contacted with the anion change resin it is diluted with water to a concentration of 20%, and a similar quality product is obtained (the permanganate number being 8.0 and the other characteristics being identical). However, more distillation of water is involved.

Example 3

The procedure of Example 2 is repeated except that the initial concentration is 65% and a similar quality product is obtained (the set point being 69.1° C., the permanganate number being 6.5, and the acidity being neutral).

Example 4

The procedure of Example 3 is repeated except that the initial concentration is 73% and a similar quality product is obtained (the set point being 69.3° C., the permanganate number being 0 and the acidity being neutral).

Example 5

The procedure of Example 4 is repeated except that the initial concentration is 70% and the product obtained is identical except for the set point which is 6.0.

Example 6

The procedure of Example 1 is repeated (using an initial concentration 65%) through the filtration step, then the water is removed and the lactam is dissolved in benzene to give a 33% solution by weight. This is slurried with 3 gms. of sodium bisulfate (or equivalent acid salt) and then with 3 gms. of calcium hydroxide (or equivalent basic material), after which it is distilled. A good quality product is obtained by fractional distillation (the set point being 69.1° C., the permanganate number being 6.0 and the acidity being 0.20 milli-equivalents/kg.).

Example 7

The procedure of Example 5 is repeated except that the oxidation is with hydrogen peroxide in amount equivalent to the permanganate used in Example 5 and a good quality product is obtained (the set point being 69.2° C., the permanganate number being 20, and the acidity being 0.08 milli-equivalents/kg.).

Example 8

The procedure of Example 3 is repeated except that the initial concentration is 67% and the liquid is treated with strongly acid cation exchange resin prior to the anion exchange resin treatment, and a good quality product is obtained (the set point being 69.5° C., the permanganate number being 2.0 and the acidity being neutral).

Example 9

The procedure of Example 8 is repeated except that the initial concentration is 78%, and a good quality product is obtained (the set point being 69.1° C., the permanganate number being 5.6 and the alkalinity being 0.06 milli-equivalents/kg.).

Example 10

The procedure of Example 9 is repeated except that the initial concentration is 65% and a good quality product is obtained (the set point being 69.1° C., the permanganate number being 5.2, and the alkalinity being 0.08 milli-equivalents/kg.).

Example 11

The procedure of Example 6 is repeated using sodium dihydrogen phosphate as the acid salt and barium hydroxide as the basic material, and similar results are obtained.

Comparable results to the foregoing are achieved with various modifications thereof including the following. The high lactam recoveries are obtained in accordance with the invention using short reaction times, ambient temperatures or temperatures in the range of 20° to 45° C. may be used, and a slight excess of the permanganate (e.g. using about 1 to 6% of the permanganate relative to the weight of the lactam). Generally the times are preferably of the order of 15 to 25 minutes or more, broadly in the range of 5 minutes to 2 hours, and the temperatures are about 20° up to about 45° C. The concentration of the permanganate in aqueous solution is in the range of about 1 to 6% preferably about 4%; the higher concentrations being used with the shorter treatment times or lower temperatures or both to get the 15 min. pink color persistence. Equivalent concentrations of equivalent oxidants are used.

The initial or crude lactam may be of a light brown or yellow color such as may be obtained in known manner by rearrangement of the corresponding ketoxime followed by flash vaporization or distillation of the lactam. Under the conditions used in accordance with the invention, especially the high concentration of the lactam (55 to 90%, preferably 58 to 80%) there is efficient oxidation or change of the impurities with little or no loss of the lactam so that good recoveries of high purity material are regularly obtained. Also another important economic advantage of the high concentration is the greatly reduced distillation requirements, as compared to prior procedures which use dilute lactam solutions.

After the permanganate or equivalent oxidation, the lactam solution is promptly treated with an acid-binding material as anion exchange resin, or another basic material, or a polar adsorbent to lower its acidity to about neutral, and then fractionally distilled to recover the high purity material.

In view of the foregoing disclosures, variations and modifications thereof will be apparent to one skilled in the art, and it is intended to include within the invention all such variations and modifications except as do not come within the scope of the appended claims.

What is claimed is:

1. In a process for refining a crude lactam including the steps of oxidizing it with an oxidant in aqueous solution and distillation, the improvement which comprises conducting the oxidation with the lactam in aqueous solution at a concentration in the range of about 55 to 90% by weight.

2. A process of claim 1 wherein the lactam is E-caprolactam.

3. A process of claim 2 wherein the oxidation temperature is in the range of 20° to 45° C. and the amount of oxidant is equivalent to the amount of potassium permanganate which gives a pink color to the mixture, which color persists for 15 minutes.

4. A process of claim 3 wherein the oxidizing solution is filtered, neutralized with an acid-binding material and promptly distilled.

5. A process of claim 4 wherein the acid binding material is a strongly basic anion exchange resin.

6. A process of claim 5 wherein the concentration in the oxidizing step is in the range of 58 to 80%.

7. A process of claim 6 wherein the oxidation is with potassium permanganate in dilute aqueous solution in an amount such that the pink color of the mixture persists for about 15 minutes at ambient temperatures.

8. A process of claim 7 wherein the solution contains at least about 60% of the lactam in the resin treating step.

9. A process of claim 8 wherein the solution is diluted with water to about 20% concentration after oxidation and before treatment with resin.

10. A process of claim 4 wherein the oxidized solution is stripped of water and the residue is dissolved in benzene, treated with an insoluble acid salt and with an insoluble basic material each in an amount in the range of about 1 to 5% based on the weight of caprolactam in the solution, and then the caprolactam is recovered by distillation.

11. A process of claim 10 wherein the oxidation is with potassium permanganate.

12. A process of claim 10 wherein the oxidation is with hydrogen peroxide.

13. A process of claim 12 wherein the acid salt is sodium bisulfate and the basic material is calcium hydroxide.

14. A process of claim 12 wherein the acid salt is sodium dihydrogen phosphate and the basic material is barium hydroxide.

15. A process of claim 4 wherein the oxidation solution is stripped of water, the residue is dissolved in benzene, and the resulting solution is passed through a column of polar adsorbent prior to distillation.

16. A process of claim 15 wherein the adsorbent is activated alumina.

References Cited in the file of this patent

UNITED STATES PATENTS 2,786,052     Kampschmidt _____ Mar. 19, 1957

FOREIGN PATENTS 532,853     Canada _____ Nov. 6, 1956
540,044     Canada _____ Apr. 23, 1957
540,045     Canada _____ Apr. 23, 1957